United States Patent
Howie, Jr.

[11] Patent Number: 5,928,763
[45] Date of Patent: Jul. 27, 1999

[54] METHOD FOR OBTAINING A TIGHT, SECURE CONNECTION BETWEEN INTERFITTING MEMBERS AND THE CONNECTION RESULTING THEREFROM

[75] Inventor: Robert K. Howie, Jr., Decatur, Ill.

[73] Assignee: The Grigoleit Company, Decatur, Ill.

[21] Appl. No.: 08/896,991

[22] Filed: Jul. 18, 1997

Related U.S. Application Data

[63] Continuation-in-part of application No. 08/502,271, Jul. 13, 1995, Pat. No. 5,783,285.

[51] Int. Cl.$^6$ .............................. B32B 3/00; A47B 95/02; B25G 3/00

[52] U.S. Cl. ...................... 428/172; 428/101; 428/161; 428/167; 403/345; 403/361; 264/241; 264/242; 74/553; 24/666; 24/669; 16/121; 16/DIG. 30

[58] Field of Search .............................. 16/121, DIG. 30; 403/347, 361, 354, 359, 345; 74/553; 24/669, 701, 666; 428/172, 101, 161, 167, 192; 264/241, 242, 510

[56] References Cited

U.S. PATENT DOCUMENTS

| | | | |
|---|---|---|---|
| 4,475,737 | 10/1984 | Cook, Jr. et al. | 277/182 |
| 4,861,183 | 8/1989 | Loos | 403/354 |
| 4,923,325 | 5/1990 | Howie, Jr. | 16/121 |
| 5,197,161 | 3/1993 | Howie, Jr. | 16/121 |
| 5,783,285 | 7/1998 | Howie et al. | 428/172 |

*Primary Examiner*—Donald Loney
*Attorney, Agent, or Firm*—Dorn, McEachran, Jambor & Keating

[57] ABSTRACT

A method for obtaining a tight, secure connection between two relatively non-deformable members and the connection resulting therefrom. The method includes the steps of forming a recess in a first of said members, forming a second member with a portion that seats in the recess of the first member, molding a liner of thermoplastic to one of the members, which thermoplastic is deformable but not more than slightly compressible, and seating the portion of the second member in the recess of the first member with one of the members engaging the liner to displace a portion of the liner into a void space in one of the members to thus form a tightly gripping connection between the members. A composite knob and its connection to shaft made in accordance with this method are also disclosed.

34 Claims, 2 Drawing Sheets

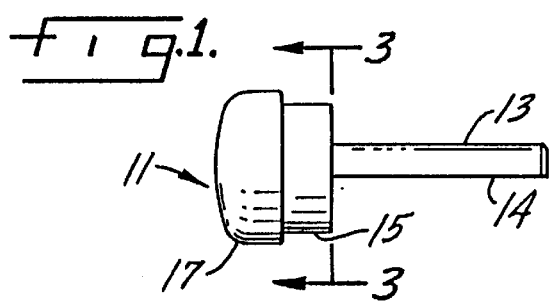
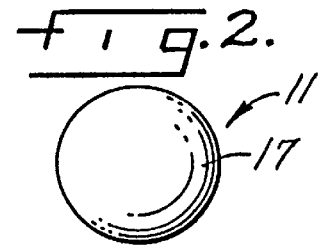
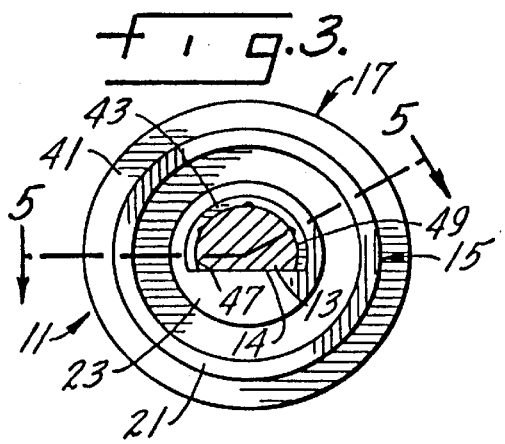
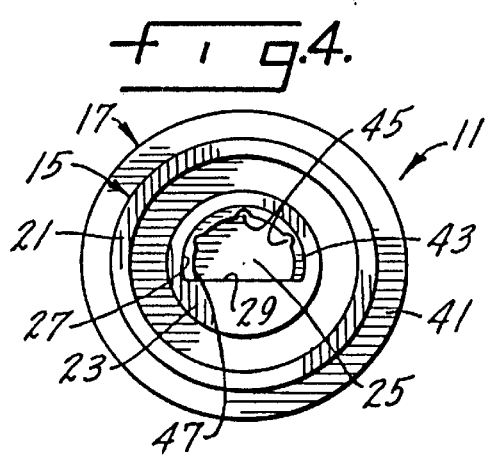
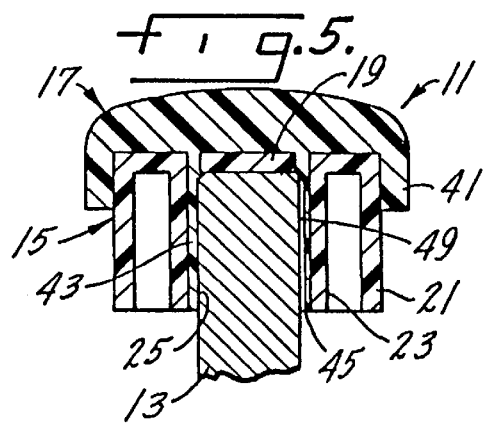
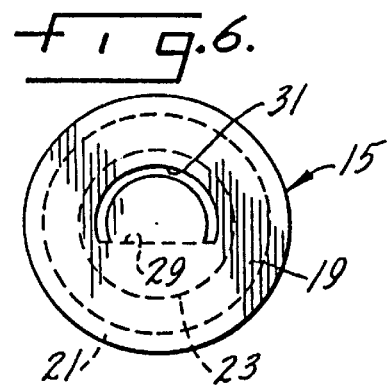
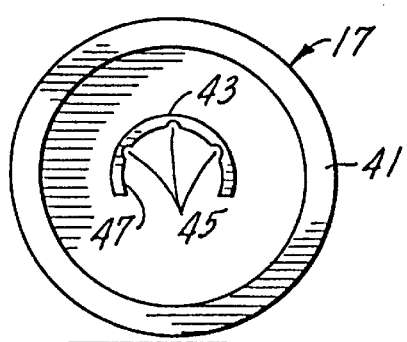
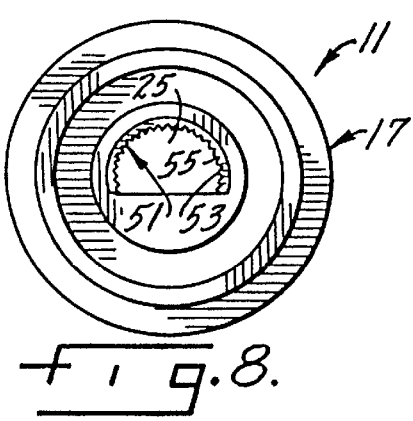

5,928,763

METHOD FOR OBTAINING A TIGHT, SECURE CONNECTION BETWEEN INTERFITTING MEMBERS AND THE CONNECTION RESULTING THEREFROM

This is a continuation-in-part of my U.S. patent application, Ser. No. 08/502,271, filed Jul. 13, 1995 now U.S. Pat. No. 5,783,285.

BACKGROUND AND SUMMARY OF THE INVENTION

This invention is directed to a method for obtaining a tight, secure connection between two relatively non-deformable members and the connection obtained by the method. Presently, secure connections between relatively non-deformable members, such as injection molded thermoplastic parts, require the use of adhesives, mechanical fasteners, fusing, forced interference engagement or the provision of resilient webs or fingers in at least one of the parts. Each of these fastening methods adds expense to the manufacture of the products formed by the members and each method has inherent disadvantages. The inherent disadvantages of the aforesaid methods become more pronounced when the members that are to be joined must be removable and reinstallable relative to one another.

This invention overcomes the aforesaid difficulties by providing a deformable but essentially non-compressible liner between the non-deformed members which are to be attached. The tight, secure connection between the members is obtained by displacing the liner into one or more void spaces located in at least one of the members when the members are brought together to be connected.

The invention utilizes a soft moldable thermoplastic material which is displaceable and essentially non-deformable to create the interference fit between the generally non-deformable members to be connected.

This invention is particularly well suited to the molding of plastic knobs of the type which are designed to fit over a shaft formed of a hollow metal tubing such as aluminum and which are intended to be placed on and removed from a shaft.

Another object of this invention is to increase the holding capacity of a thermoplastic knob to a non-deformable shaft by providing a displaceable cushion to resist movement of the shaft engaging webs or fingers of the knob.

Yet another object of this invention is to increase the holding capacity of a thermoplastic knob to a non-deformable shaft by providing a deformable yet generally not compressible cushion between the non-deformable shaft engaging members which cushion includes a self-contained void space.

Still another object of this invention is to increase the holding capacity of a thermoplastic knob to a non-deformable shaft by providing a displaceable cushion for the shaft engaging webs or fingers of the knob and providing a constraining wall in the hub of the knob for receiving the cushion which constraining wall moves to accommodate displacement of the cushion.

Other objects of the invention will be found in the following specification, claims and drawings.

BRIEF DESCRIPTION OF THE DRAWINGS

The invention as applied to the manufacture of a knob is illustrated more or less diagrammatically in the following drawings wherein:

FIG. 1 is a side elevational view of the composite knob of this invention seated on a shaft;

FIG. 2 is a top plan view of the knob and shaft of FIG. 1;

FIG. 3 is an enlarged cross sectional view taken along lines 3—3 of FIG. 1;

FIG. 4 is an enlarged bottom view of the cap of FIG. 1 with the shaft removed from the socket of the cap;

FIG. 5 is a cross sectional view taken along line 5—5 of FIG. 3;

FIG. 6 is a top plan view of the core portion of the composite cap;

FIG. 7 is a bottom view of the cap portion of the composite knob;

FIG. 8 is an enlarged end view of a modified form of cap with the shaft removed from the socket;

DESCRIPTION OF THE PREFERRED EMBODIMENTS

Figure 9:
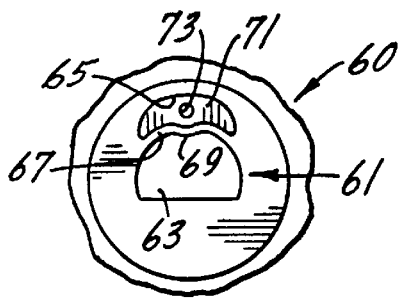
FIG. 9 is a partial bottom plan view of a core portion of a third embodiment of the invention.

The method of this invention is adaptable to the manufacture and attachment of products and items of various types. For clarity of explanation, it will be described as applied to the manufacture of a composite knob which is removably mountable on a shaft.

FIG. 1 of the drawings shows a composite knob 11 of one embodiment of this invention manufactured in accordance with the method of this invention. The knob is to intended to be seated on a shaft 13 for removal and reinstatement relative to the shaft. The shaft 13 is conventionally formed of metal, usually aluminum, and may be solid or tubular. A flat 14 is formed on one side of the shaft. The core 15 of the knob 11 is preferably injection molded of a thermoplastic material which under normal conditions of use is not deformable. The core conventionally includes a top wall 19, an outer skirt 21 which is formed integrally with the top wall and an inner hub 23 also formed integrally with the top wall. A socket 25 for receiving the shaft 13 is formed as part of the hub and is defined by an arcuate wall 27 and a flat wall 25 which engages the flat 14 of the shaft when the shaft is inserted in the socket. An arcuate passage 31 is formed in the top wall of the core immediately inwardly of the arcuate wall 27.

The cap 17 of the knob 11 is molded also of a thermoplastic material that is softer than the thermoplastic material of the core 15. The thermoplastic material of cap 17 is deformable but is not compressible under normal use, that is to say that it is, for practical purposes, not more than slightly compressible. A suitable material for the cap is a polyvinyl chloride or a thermoplastic rubber. The core 15 may be formed of a nylon.

The cap 17 may be molded in the second shot of a two shot molding process. The cap 17 is formed with a rim 41 which fits over a portion of the outer skirt 21 of the core. The cap also includes an arcuate shaped liner 43 which extends through the arcuate passage 31 in the top wall 19 of the core and into the socket 25 of the core adjacent the arcuate wall 27 thereof. The liner 43 has longitudinal grooves 45 formed in its concave inner wall 47 due to the insertion of pins or the like (not shown) during the molding process. Thus, when the composite knob is molded and before insertion of the shaft, the liner 43 is shown most clearly in FIG. 4 of the drawings where it is positioned against the arcuate inner wall 27 of the hub 23. The transverse cross section of the open socket 25 is smaller than the similar cross section of the shaft.

When the shaft 13 is inserted into the socket as shown in FIGS. 3 and 5 of the drawings, the convex wall 49 of the shaft engages and displaces the material of the liner 43 so that the deformable and generally non-compressible material of the liner 43 is moved into the longitudinal grooves 45 formed in the liner to create an interference fit between the shaft 13 and the hub 23 of the core 15. The longitudinal grooves 45 of the liner, in effect, are void spaces which receive the material of the liner as it is displaced when the shaft is inserted into the socket 25.

Upon removal of the shaft 13 from the socket 25 of the core 15, the liner 43 essentially returns to the shape shown in FIG. 4 of the drawings.

A second embodiment of the composite knob 11 is shown in FIG. 8 of the drawings. It is identical to the knob 11 previously described except for an alteration to the liner 43. Instead of being formed with three longitudinal grooves 45 in its concave inner wall 47, a plurality of serrations 51 are formed in the inner wall 47. When the shaft 13 is inserted in the socket 25, the material of the peaks 53 of the serrations are displaced into the valleys 55 located between the peaks which valleys function as void spaces to receive the displaced material of the liner 43.

A third embodiment of the composite knob 11 is shown in FIG. 9 of the drawings. The knob 60 of this embodiment is similar to the knob 11 previously described except for the modifications which are hereinafter described. This modified knob need not be formed with a cap of a softer thermoplastic material such as a previously described cap 17. The hub 61 of knob 60 is formed with a socket 63 and an adjacent cavity 65. A thin web 67 is formed between the socket 63 and the cavity 65. It should be understood that the socket and the cavity need not be of the same axial depth relative to the hub 61. Further, the web need not extend the full axial depth of the cavity but may terminate short of the bottom of the cavity to provide more bending flexibility to the web 67. To provide additional bending flexibility, a bump 69 is formed in the web with the bump protruding into the socket 63.

The cavity 65 is filled with a cushion 71 of a thermoplastic material identical to the thermoplastic material previously described for the cap 17 and liner 43. This thermoplastic material is deformable but is not compressible under normal use, that is to say that it is, for practical purposes not more than slightly compressible. A suitable material for the cushion is a polyvinyl chloride or a thermoplastic rubber. A void space 73 in the shape of a cylinder is formed in the cushion 71. When a shaft (not shown) is inserted into the socket 63, the shaft engages the bump on the web 67 forcing the web against the cushion 71. The thermoplastic material of the cushion is displaced filling the void space 73 therein thus providing a tight fitting connection between the shaft, the web 67 and the cushion 71.

Figure 10:
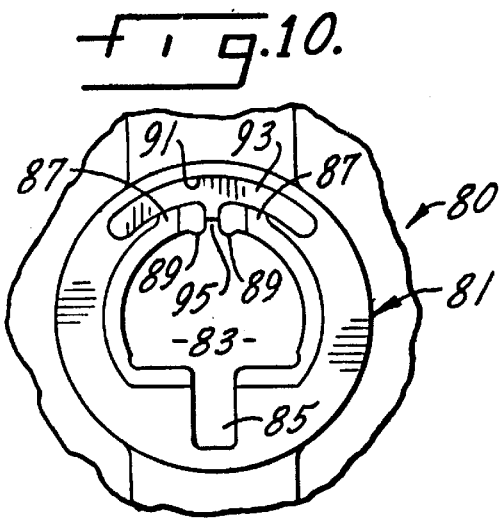
FIG. 10 is an enlarged partial bottom plan view of a core portion of a fourth embodiment of the invention.

A fourth embodiment of the composite knob 11 is shown in FIG. 10 of the drawings. Knob 80 is similar to the knob 11 previously described except for the hereinafter described modifications to the hub. This modified knob need not be formed with a cap of a softer thermoplastic material such as previously described cap 17. The hub 81 of knob 80 is formed with a socket 83 of irregular transverse cross-section. A coring slot 85 extends into the socket. Curved elongated fingers 87 extend non-radially into the socket. The fingers terminate in tips 89 which are located close to but out of contact with each other. Located radially outwardly of the fingers 87 is an arcuate portion 91 of the socket. It should be understood that the arcuate portion 91 of the socket need not be of the same axial depth relative to the hub 81 as is the socket 83. Also the fingers 87 extends substantially the full depth of the socket 83. A stop (not shown) is provided in the socket to prevent the shaft from being inserted to the bottom of the socket. Flexibility of the fingers is obtained without requiring the end of the fingers to terminate short of the bottom of the socket because the shaft, when inserted, cannot reach the bottom of the socket. A more detailed description of the construction and function of the fingers of this and hereinafter described embodiments of this invention can be found in U.S. Pat. No. 4,923,325 which is incorporated herein by reference.

The arcuate portion 91 of the socket is filled with a cushion 93 of a thermoplastic material of the type previously described for the cap 17 and liner 43. When a shaft (not shown) is inserted into the socket 83, the shaft engages the tips 89 of the fingers 87 forcing the fingers against the cushion 93. The thermoplastic material of the cushion, which is displaceable, is displaced into the portion 95 of the socket located between the fingers to provide a tight fitting connection between the shaft, the fingers 87 and the cushion 93. It should be understood that the shaft need not ever contact the cushion 93 since it is urging the fingers 87 into displaceable contact with the cushion.

Figure 11:
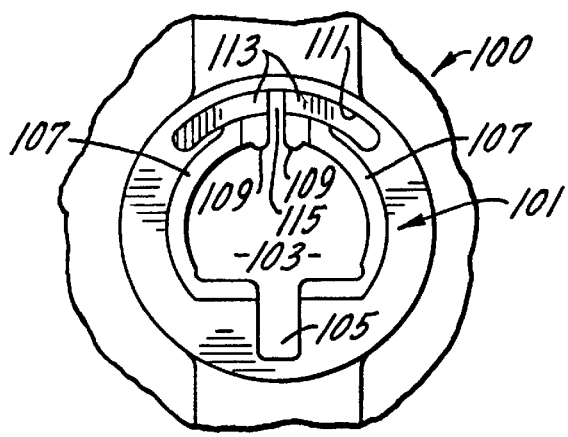
FIG. 11 is an enlarged partial bottom plan view of a core portion of a fifth embodiment of the invention.

A fifth embodiment of the composite knob 11 is shown in FIG. 11 of the drawings. Knob 100 is similar to the knobs previously described except for the hereinafter described modifications to the hub. The hub 101 of knob 100 is formed with a socket 103 of irregular transverse cross-section. A coring slot 105 extends into the socket. Curved elongated fingers 107 extend non-radially into the socket 103. These fingers terminate in tips 109 which are located close to but out of contact with each other. These fingers separate the main socket 103 from an arcuate portion 111 of the socket which is located radially outwardly of the fingers. The fingers extend substantially the full depth of the socket 103. A stop (not shown) is provided in the socket to prevent the shaft from being inserted into the bottom of the socket. Flexibility of the fingers 107 is obtained without requiring the ends of the fingers to terminate short of the bottom of the socket because the shaft cannot reach the bottom of the socket. However, that the arcuate portion of the socket need not be of the same axial depth relative to the hub as is the socket. The arcuate portion 111 of the cavity is filled with two cushions 113 each arcuate in shape and made of a thermoplastic material of the type previously described which is deformable but not compressible under normal operating conditions.

When a shaft (not shown) is inserted into the socket 103 it bears against the tips 109 of the fingers 107 forcing them against the cushions 113. The thermoplastic material of the cushions is displaced filling the void space 115 located between the tips of the fingers and the socket 103. This provides a tight fitting connection between the shaft, the fingers 107 and the cushions 103 although it should be understood that it is not necessary that the shaft contact the cushions.

Figure 12:
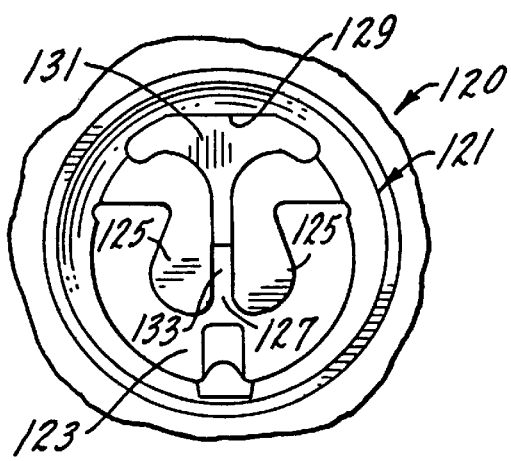
FIG. 12 is an enlarged partial bottom plan view of a core portion of a sixth embodiment of the invention.

A sixth embodiment of the composite knob 11 is shown in FIG. 12 of the drawings. Knob 120 is similar to the knob 11 previously described except for the hub which has been modified as hereinafter described. This modified knob need not be formed with a cap of a softer thermoplastic material such as previously described cap 17. The hub 121 of knob 120 is formed with a socket 123. A pair of generally L-shaped fingers 125 are formed integrally with the hub and extend into the socket for the full depth thereof. A diametrically extending slot 127 is formed between the fingers. The slot leads into an arcuate portion 129 of the socket. A more detailed construction of the L-shaped fingers of this hub can be found in my U.S. Pat. No. 5,197,161 which is incorporated herein by reference.

The arcuate portion 129 of the socket 123 is filled with a cushion 131 of a thermoplastic material which as previously described is deformable and is displaceable under normal conditions of use. The cushion is in adjacent a void space 133 located in the diametrically extending slot 127 between the L-shaped fingers 125. When a U-shaped shaft (not shown) is inserted into the socket 123 and engages the L-shaped fingers 125 in the manner described in my previously mentioned '161 patent, the fingers 125 are forced against the cushion 131 and the thermoplastic material of the cushion is displaced to fill the void space 133 and thereby provide a tight fitting connection between the U-shaped shaft, the L-shaped fingers 125 and the cushion 131.

Figure 13:
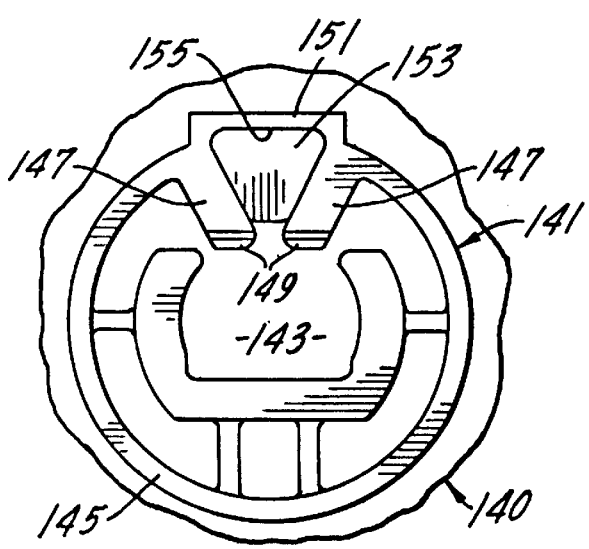
FIG. 13 is an enlarged partial bottom plan view of a seventh embodiment of the invention.
Figure 14:
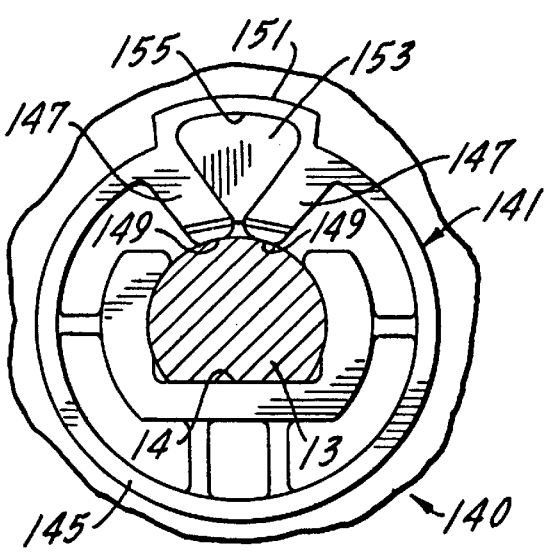
FIG. 14 is a view of the core of FIG. 13 showing a shaft seated in the socket.

A seventh embodiment of the composite knob 11 is shown in FIGS. 13 and 14 of the drawings. The knob 140 of the seventh embodiment is similar to the knobs previously described except for the changes in the hub to be hereinafter described. The modified knob need not be formed with a cap of a softer thermoplastic material such as previously described cap 17. The hub 141 of knob 141 is formed with a socket 143 with the socket defined by a somewhat cylindrical wall 145. Converging fingers 147 extend radially inwardly from the cylindrical wall terminating in tips 149 which are located close to but away from each other. Each tip 149 is not perfectly semi-circular but extends toward the socket 143 a somewhat greater distance on the side of each finger 147 located adjacent to the other finger 147. A complete and detailed description of the finger construction can be found in my previously mentioned U.S. Pat. No. 4,923,325. A portion of the somewhat cylindrical wall 145 is formed as a linear wall 151 which extends between the bases of the fingers 147 and is much thinner than the remainder of the wall 145 to provide flexibility. A cushion 153 of a thermoplastic identical to the thermoplastic material previously described is positioned in a void space 155 located between the fingers and the linear portion 151 of the wall 145. When a shaft 13 is inserted in the socket 143 as shown in FIG. 14 it bears against the tips 149 of the fingers 147 forcing them together and against the cushion 153. This force is transmitted to the linear wall portion 151 forcing it to bow out as shown in FIG. 14 to provide a tight fitting connection between the shaft, the fingers 147 and the cushion 153.

Whereas, the method of my invention has been shown and described as applied to the manufacture of a knob which can be removably attached to a hollow metal shaft to obtain a tight secure connection between the relatively non-deformable plastic material of the knob and the non-deformable metal of the shaft, it should be apparent that the method can be applied to the fastening of other relatively non-deformable members using a liner of a deformable but not more than slightly compressible thermoplastic located between the non-deformable members and displaceable into void spaces in one of the members when the members are connected.

I claim:

1. A method for obtaining a secure connection between two interfitting members, including the steps of:
   forming a recess in a first of said members,
   forming a second of said members with a portion which seats in said recess of said first member,
   locating a thermoplastic cushion in said first member at least in proximity to said recess,
   said thermoplastic cushion being deformable and only slightly compressible,
   providing a void space for accommodating deformation of said thermoplastic cushion in one of said members,
   forming said first member with a deflectable portion in contact with said thermoplastic cushion,
   seating said portion of said second member in said recess of said first member in engagement with said deflectable portion to move said deflectable portion to thereby displace a portion of said deformable cushion into said void space to form a tightly gripping connection between said first and second members.

2. The method of claim 1 including the step of forming said void space in said thermoplastic cushion.

3. The method of claim 1 including the step of forming said deflectable portion between said recess and said cushion.

4. The method of claim 1 including the step of forming said deflectable portion as a web.

5. The method of claim 1 including the step of forming the deflectable portion as a finger.

6. The method of claim 1 including the step of partially enclosing said cushion with a deflectable wall.

7. A deformable, tightly gripping connection between two relatively non-deformable members,
   a first of said non-deformable members having a socket,
   a second of said non-deformable members having a portion which seats in said socket,
   a cushion of a thermoplastic which is deformable and only slightly compressible located in said first member at least approximate to said socket,
   a void space for accommodating deformation of said cushion, and
   a deflectable portion formed as a part of said first member in contact with said cushion and located adjacent said socket,
   a portion of said cushion being displaceable into said void space upon seating of said second member into said socket to form a tightly gripping connection between said first and second members.

8. The connection of claim 7 in which said void space is formed in said cushion.

9. The connection of claim 7 in which said deflectable portion is located between said socket and said void space.

10. The connection of claim 7 in which said deflectable portion is a web.

11. The connection of claim 7 in which said deflectable portion is a finger.

12. The connection of claim 7 in which said socket is partially enclosed by a deflectable wall.

13. A composite knob adapted to be removably attached to the end of a shaft, said knob including:
    a core of a hard thermoplastic,
    said core having a shaft receiving socket,
    a cushion of a thermoplastic which is deformable and only slightly compressible located in said core at least approximate to said socket, a void space for accommodating deformation of said cushion, and a deflectable portion formed as a part of said core in contact with said cushion and located adjacent said socket, a portion of said cushion being deplaceable into said void space upon seating of said shaft into said socket to tightly grip said shaft to said socket.

14. The composite knob of claim 13 in which said void space is formed in said cushion.

15. The composite knob of claim 13 in which said deflectable portion is located between said cushion and said socket.

16. The composite knob of claim 13 in which said deflectable portion is a web.

17. The composite knob of claim 13 in which said deflectable portion is a finger.

18. A method for obtaining a secure connection between two interfitting members, including the steps of:

forming a recess in a first of said members, forming a second of said members with a portion which seats in said recess of said first member, locating a thermoplastic cushion in said first member at least in proximity to said recess, said thermoplastic cushion being flowable when displaced, providing a void space for accommodating deformation of said thermoplastic cushion in one of said members, forming said first member with a deflectable portion in contact with said thermoplastic cushion, seating said portion of said second member in said recess of said first member in engagement with said deflectable portion to move said deflectable portion to thereby displace a portion of said deformable cushion into said void space to form a tightly gripping connection between said first and second members.

19. The method of claim 18 including the step of forming said void space in said thermoplastic cushion.

20. The method of claim 18 including the step of forming said deflectable portion between said recess and said cushion.

21. The method of claim 18 including the step of forming said deflectable portion as a web.

22. The method of claim 18 including the step of forming the deflectable portion as a finger.

23. The method of claim 18 including the step of partially enclosing said cushion with a deflectable wall.

24. A deformable, tightly gripping connection between two relatively non-deformable members, a first of said non-deformable members having a socket, a second of said non-deformable members having a portion which seats in said socket, a cushion of a thermoplastic which is flowable when displaced located in said first member at least approximate to said socket, a void space for accommodating displacement of said cushion, and a deflectable portion formed as a part of said first member in contact with said cushion and located adjacent said socket, a portion of said cushion being displaceable into said void space upon seating of said second member into said socket to form a tightly gripping connection between said first and second members.

25. The connection of claim 24 in which said void space is formed in said cushion.

26. The connection of claim 24 in which said deflectable portion is located between said socket and said void space.

27. The connection of claim 24 in which said deflectable portion is a web.

28. The connection of claim 24 in which said deflectable portion is a finger.

29. The connection of claim 24 in which said socket is partially enclosed by a deflectable wall.

30. A composite knob adapted to be removably attached to the end of a shaft, said knob including:

a core of a hard thermoplastic, said core having a shaft receiving socket, a cushion of a thermoplastic which is flowable when displaced located in said core at least approximate to said socket, a void space for accommodating displacement of said cushion, and a deflectable portion formed as a part of said core in contact with said cushion and located adjacent said socket, a portion of said cushion being deplaceable into said void space upon seating of said shaft into said socket to tightly grip said shaft to said socket.

31. The composite knob of claim 30 in which said void space is formed in said cushion.

32. The composite knob of claim 30 in which said deflectable portion is located between said cushion and said socket.

33. The composite knob of claim 30 in which said deflectable portion is a web.

34. The composite knob of claim 30 in which said deflectable portion is a finger.

* * * * *